United States Patent [19]
White et al.

[11] Patent Number: 5,356,655
[45] Date of Patent: Oct. 18, 1994

[54] STARCH-THICKENED ACIDIC FOODSTUFFS AND METHOD OF PREPARATION

[75] Inventors: Pamela J. White; Linda M. Pollak; Lawrence A. Johnson, all of Ames, Iowa

[73] Assignees: Iowa State University Research Foundation, Inc., Ames, Iowa; The United States of America as represented by the Secretary of Agriculture, Washington, D.C.

[21] Appl. No.: 53,146

[22] Filed: Apr. 27, 1993

[51] Int. Cl.⁵ ............................................. A23L 1/0522
[52] U.S. Cl. ................................... 426/578; 426/579; 426/661; 426/589
[58] Field of Search ................. 426/578, 579, 661, 589

[56] References Cited

U.S. PATENT DOCUMENTS

| | | | |
|---|---|---|---|
| 3,770,461 | 11/1973 | Stewart et al. | 426/579 |
| 4,428,972 | 1/1984 | Wurzburg et al. | 426/578 |
| 4,615,888 | 10/1986 | Zallie et al. | 426/661 |
| 4,792,458 | 12/1988 | Friedman et al. | 426/578 |
| 4,798,735 | 1/1989 | Friedman et al. | 426/578 |
| 5,009,911 | 4/1991 | Mauro et al. | 426/579 |

FOREIGN PATENT DOCUMENTS

91/02462  3/1991  World Int. Prop. O. .

OTHER PUBLICATIONS

Eyster (1934) *Bibilographia Genetica* 11:187–392.
Inouchi I et al. (1991) *Starch/Starcke,* 43:468–472.
Inouchi II et al. (1991) *Starch/Starke,* 43:473–477.
Shannon and Garwood (1984), "Genetics and Physiology of Starch Development", pp. 25–89. In Whistler et al. (ed.) Starchi *Chemistry and Technology* Academic Press San Diego, California U.S.
Vineyard et al. (1958) *Agron I.* 50:595–598.
White et al. (1990) "Intra and Interpopulation Variability of Thermal Properties of Maize Starch," *Ceral Chem.* 67(1) 70–73.

*Primary Examiner*—Jeanette Hunter
*Attorney, Agent, or Firm*—Tilton, Fallon, Lungmus & Chestnut

[57] ABSTRACT

Starch-thickened acidic foodstuffs are provided in which the starch used as a thickener comprises sugary-2 starch obtaining from sugary-2 genotype maize seeds. Sugary-2 starch can be effectively used as a thickener in foodstuffs having a pH of 2.0 to 5.5.

16 Claims, No Drawings

STARCH-THICKENED ACIDIC FOODSTUFFS AND METHOD OF PREPARATION

FIELD OF INVENTION

The field of this invention is the use of starch as a thickener or gelling agent for food products. More particularly, the invention in concerned with the use of starch thickeners in acidic foodstuffs.

GRANT REFERENCE

The research leading to this invention was partly funded by a grant from the USDA, CSRS, entitled "Research and Technology Transfer programs of the Utilization Center for Agricultural Products" (No. 89-38811-4569). The United States Government has rights thereto.

BACKGROUND OF INVENTION

It is known that recessive mutant genes in maize can have an effect on the properties of corn starch, and that a recessive gene can be expressed by controlled breeding of maize. Some of these mutant genes which have been identified in maize comprise the genotypes: waxy (wx), amylose extender (ae), dull (du), sugary-1 (su1) and sugary-2 (su2). These recessive genes may be expressed individually or as double-recessive or triple-recessive mutants, such as the amylose extender sugary-2 genotype (aesu2), the waxy sugary-2 genotype (wxsu2), the dull sugary-2 genotype (dusu2) and the amylose extender waxy genotype (aewx). Uses of these double-recessive mutants in foodstuffs have been proposed, as described, for example, in U.S. Pat. Nos. 4,428,972 (wxsu2), 4,615,888 (wxsu2), 4,792,458 (dusu2) and 4,798,735 (aesu2). The published PCT application WO 91/02462 describes uses of the aewx genotype as a thickener in foodstuffs having acidic pHs. It is claimed that starch obtained from this maize genotype shows greater stability in acid foodstuffs, being comparable in that respect to crosslinked waxy starch.

As far as it is known, no patents or publications have described or proposed food uses for sugary-2 (su2) starch, which is obtained from the single recessive maize mutant sugary-2. This sugary-2 mutant was first discussed by Eyster (1934) *Bibilographia Genetica*, 11:187–392. The sugary-2 gene is located on chromosome 6. The endosperm of sugary-2 kernels ranged from translucent to opaque depending on the number and size of the starch grains developed. The kernels may be slightly or not at all wrinkled. There is no linkage between the sugary-2 (su2) and sugary-1 (su1)-genes. Vineyard et al. (1958) reported an average amylose content of 39% for five sources of su2 mutants, Agron. J., 50:595–598. Mutant kernels are similar to normal kernels in soluble sugar, in water-soluble polysaccharides, and in starch concentrations: Shannon and Garwood (1984), "Genetics and Physiology of Starch Development", pp.25–86, In Whistler et al. (ed.), *Starch: Chemistry and Technology*, Academic Press, San Diego, Calif.

The gelatinization and retrogradation properties of sugary-2 starch have been studied and compared with other recessive mutant starches. [See Inouchi, et al. (1991) *Starch/Starke*, 43:468–472, and 473–477.] These investigators found that the expression of the sugary-2 gene reduced starch gelatinization temperatures, and also reduced the heat of gelatinization of retrograded sugary-2 starch.

In acidic foodstuffs which are typically thickened with starch, such as for example, lemon pudding or a lemon pie filling, the thickening and gelling property of the starch tends to be degraded over time due to acidic conditions. There has been a need for starches which are more stable under acid conditions, and which can continue to perform a thickening or gelling function for a longer time at an acid pH. Acid stability is of particular interest for commercial food products which are prepared at a manufacturing plant and distributed and stored in a frozen or non-frozen condition. The desire for such an improved form of starch is illustrated by the recently published PCT application of American Maize-Products Company WO 91/02462 (cited above). This PCT application discloses uses of the amylose extender waxy genotype maize seeds as a source for an aewx-starch useful as a thickener in acidic foodstuffs. Heretofore, as far as it is known, it has not been suggested that a sugary-2 starch could be used as a thickener for acidic foodstuffs.

SUMMARY OF INVENTION

This invention is based on an extensive study of the properties of sugary-2 starch for use as a thickener or gelling agent in acidic foodstuffs. The sugary-2 starch, as derived from sugary-2 maize genotype seeds was found to be highly effective as a thickener or gelling agent under acid pH conditions. The sugary-2 starch exhibited excellent freeze-thaw stability in acidic foodstuffs, and water is effectively retained in gels formed with sugary-2 starch at acidic pHs. A further advantage is that such acidic gels have and retain greater firmness. In these applications, su2-starch was found to function like modified amylopectin, providing increased viscosity under acid conditions.

DETAILED DESCRIPTION

Purified sugary-2 starch for use in practicing the present invention can be derived from the maize mutant identified as sugary-2 (su2). This mutant is readily distinguishable from the sugary-1 (su1) mutant, and has different properties. The su2 mutant expresses only one recessive gene, the sugary-2 gene. It is thereby different than double or triple recessive mutants which also express the su2 gene (viz. wxsu2, dusu2, or aesu2 genotypes).

A suitable extraction and purification procedure of preparing small quantities of the su2 starch was described by White et al. (1990), *Cereal Chemistry*, 67:70–73. Larger quantities can be prepared by standard wet milling procedures, as used in the maize starch industry. The maize seeds are wet milled to extract the corn starch from the corn kernels. In general, wet milling comprises the steps of steeping and grinding the corn kernel, and then separating the starch from the other components of the kernel.

More specifically an attrition type wet milling operation can be first carried out to release the germ from the rest of the kernel. After separation of the released germ by centrifugation, the remaining components of the kernel are maintained in a slurry which is subjected to a second attrition type milling. Washing screens are used to separate the bran from the starch and gluten. The starch and gluten pass through the screens, and thereafter the starch is separated from the protein. This step is usually carried out by centrifugation. The slurry which contains the starch granules is then dewatered and the resulting granules washed with fresh water and dried in a conventional manner.

The purified su2-starch can be used in granular form, or it can be pre-gelatinized, such as by drum drying. Pre-gelatinized starch can be dispersed in water to act as a thickener or gelling agent without application of heat. The su2-starch, as a powder or flour, can be mixed with other dry ingredients and sold in that form, for example, in dry mixes. Unless the starch is pregelatinized to provide a thickening or gelling action, the starch is heated to a temperature at which it gelatinizes.

The present invention can be advantageously applied to foodstuff mixtures in which starch is used as a thickener and which have an acidic pH below 5.5. In practicing the invention, there is incorporated in such mixtures an effective thickening amount of the sugary-2 starch. Many foodstuffs requiring starch thickening have acidic pHs when combined with water, or with a starch sol prepared by combining the sugary-2 starch with water. The acid pH usually results from the presence of a food acid, such as citric or acetic acid. Natural citrus flavors, such as lemon, orange, grapefruit and lime contain citric acid. When they are combined with other food ingredients acid pHs in the range of 2.5 to 4.5 can result. Acidic pHs lower than 2.0 are not usually found in foodstuffs. An effective pH range for the sugary-2 starch is above pH 2.0 and below pH 5.5. In preferred embodiments the pH of the acidic foodstuff is below 5.0, and above 2.5.

The foodstuffs in which the sugary-2 starch can be advantageously incorporated include citrus puddings and fillings, such as particularly lemon pudding and fillings, tomato sauces and tomato paste, vinegar-containing salad dressings, cheese spreads, especially those with reduced fat, and baby foods if formulated with an acidic pH. Foodstuffs of this kind can be manufactured and distributed in a completely prepared form, or as dry mixes. Prepared products such as lemon pies can be manufactured and distributed either in frozen or non-frozen condition.

Sugary-2 starch either in granular form or in pregelatinized form can be incorporated in dry ingredients with later addition of water and heating if required to gelatinize the starch. Alternatively, the su2-starch can first be combined with water to form a sol, and the sol combined with other food ingredients. On a water basis, such as the water used to form the sol, from 1 to 20% by weight of the su2-starch can be used. On a total ingredient basis, typically about 1 to 4% by weight of the sugary-2 starch is used. In general, however, an amount of the sugary-2 starch should be present which effectively provides thickening or gelling property desired in the particular recipe. Other ingredients can be those usually incorporated in starch-thickened food product, such as sugar, flavorings, eggs, butter, margarine, vegetable gums, etc. In dry mixes, 1 to 15% by weight of the su2-starch can be used.

The present invention and the results obtainable thereby are further illustrated by the following experimental or practical examples.

EXAMPLE I

Purified su2-starch (wet-milled in quantity) was compared to high-amylose starch (Amaizo 5) and Amaizo PFP (pure food powdered, a "normal" dent corn starch) from American Maize Co. or Tuson (a "normal" dent corn grown as a control) starch. The su2-starch had an amylose content of about 35% compared with a value of about 25% for normal cornstarch and 50% for Amaizo. By gel permeation chromatography, the su2-starch shows a high portion of "intermediate" materials as compared with normal cornstarch. By light microscopy under polarized light, su2-starch exhibits evidence of the maltese cross, indicating at least some crystallinity, being less than that of normal cornstarch but more than that of waxy cornstarch, and thereby similar to that of high-amylose cornstarch. X-ray diffraction reveals an A-pattern for su2-starch, but with weak and broad diffraction peaks when compared with Tuson starch, suggesting a low degree of crystallinity for su2-starch. By image analysis, su2-starch had small granules, averaging 7.2 microns, compared with 10.2 microns for Tuson starch, and 8.4 for Amylo 5 starch.

Purified su2-starch as thus characterized was used in this example and in the following examples. In the study of this example, the behavior of starch pastes (8% gel) at several pHs was compared by means of a Brabender Viscoamylograph. The peak onset temperature was higher for both Amaizo 5 and su2-starches at all pHs than for Tuson and PFP starches. Most values were similar at similar pHs for Tuson and PFP starches. Amaizo 5 and su2-starches behaved similarly to each other, except that su2-starch was generally more viscous after the end of the cooling time than was Tuson starch. Importantly, the su2-starch was thicker after cooling at acid pHs, such as from about 3 to 4.5. The data is summarized below in Table A.

TABLE A

| | Pasting Characteristics of 8% Starch Gels.[a] | | | | | |
|---|---|---|---|---|---|---|
| Treatment | Pasting Temp (°C.) | Peak Viscosity (BU)[b] | Peak Temp (°C.) | Viscosity 95° C.-39 min (BU) | Viscosity 50° C.-30 min (BU) | Shear[c] (BU) |
| PFP | | | | | | |
| pH 2.0 | 69 | 480 | 86 | 10 | 10 | 470 |
| pH 3.0 | 71 | 640 | 92 | 20 | 20 | 620 |
| pH 4.9 (normal) | 70 | 670 | 95 | 373 | 735 | 297 |
| pH 5.0 | 64 | 690 | 95 | 400 | 790 | 290 |
| pH 6.0 | 65 | 670 | 95 | 385 | 740 | 285 |
| su2 | | | | | | |
| pH 3.0 | 92 | 65 | 95 | 60 | 237 | 5 |
| pH 4.6 (normal) | 91 | 79 | 93 | 81 | 312 | −2 |
| pH 5.0 | 92 | 70 | 95 | 70 | 420 | 0 |
| pH 6.0 | 94 | 58 | 95 | 60 | 330 | −2 |
| Amaizo 5 | | | | | | |
| pH 3.0 | 90 | 37 | 95 | 20 | 50 | 17 |
| pH 4.0 | 93 | 40 | 95 | 40 | 280 | 0 |
| pH 5.0 | 90 | 39 | 95 | 37 | 140 | 2 |
| pH 5.2 (normal) | 95 | 35 | 95 | 35 | 160 | 0 |

TABLE A-continued

Pasting Characteristics of 8% Starch Gels.[a]

| Treatment | Pasting Temp (°C.) | Peak Viscosity (BU)[b] | Peak Temp (°C.) | Viscosity 95° C.-39 min (BU) | Viscosity 50° C.-30 min (BU) | Shear[c] (BU) |
|---|---|---|---|---|---|---|
| pH 6.0 | 95 | 33 | 95 | 30 | 90 | 3 |
| Tuson | | | | | | |
| pH 2.0 | 74 | 420 | 86 | 20 | 20 | 400 |
| pH 3.0 | 72 | 620 | 92 | 70 | 70 | 550 |
| pH 3.7 (normal) | 69 | 610 | 90 | 170 | 300 | 440 |
| pH 5.0 | 71 | 740 | 90 | 360 | 700 | 380 |
| pH 6.0 | 68 | .70 | 95 | 190 | 400 | 180 |

[a]Brabender Viscoamylograph, C.W. Brabender Instruments, Inc., S. Hackensack, NJ. Data are the means of one to three replicates.
[b]Brabender Units.
[c]Shear = Peak Viscosity-Viscosity at 95° C. for 30 min.

EXAMPLE II

Freeze-thaw stability of starch gels prepared in the Viscoamylograph was measured by placing 20 grams of gel in each of 18 round bottom centrifuge tubes for each starch type and storing them at −18° C. for 24 hours per cycle. All samples were warmed in a 30° C. water bath for two hours at the end of each 24-hour cycle. Three tubes then were removed for measuring and the remaining tubes were replaced in the freezer for another cycle. After six cycles, all the tubes were measured. The gels were measured for water leakage after centrifuging the tubes at 1500×g. The data from three gels at each cycle were averaged. Table B presents a comparison of the different starch types. Significantly the su2-starch exhibited less leakage of water (syneresis) than did the other starches at acid pHs, especially in the 3 to 4.5 pH range.

TABLE B

Syneresis of 8% Corn Starch Gels.[a]

| Treatment | Cycle 1[b] g H2O | Cycle 2 g H2O | Cycle 3 g H2O | Cycle 4 g H2O | Cycle 5 g H2O | Cycle 6 g H2O |
|---|---|---|---|---|---|---|
| PFP | | | | | | |
| pH 2.0 | no gel | | | | | |
| pH 3.0 | no gel | | | | | |
| pH 5.0 | 0.4 | 0.0 | 2.8 | 2.6 | 2.2 | 3.2 |
| pH 6.0 | 0.6 | 0.0 | 2.8 | 0.8 | 4.4 | 2.2 |
| su2 | | | | | | |
| pH 2.0 | no gel | | | | | |
| pH 3.0 | 4.1 | 4.3 | 6.1 | 5.1 | 4.9 | 5.3 |
| pH 4.4 (normal) | 4.6 | 6.6 | 6.2 | 5.6 | 6.8 | 6.2 |
| pH 5.0 | 5.0 | 6.0 | 6.4 | 6.0 | 5.4 | 5.8 |
| pH 6.0 | 6.2 | 7.2 | 6.2 | 7.0 | 7.0 | 8.2 |
| Amaizo 5 | | | | | | |
| pH 2.0 | no gel | | | | | |
| pH 3.0 | 9.2 | 7.4 | 10.4 | 8.8 | 10.2 | 6.4 |
| pH 4.0 | 8.0 | 9.4 | 8.2 | 5.8 | 8.8 | 9.2 |
| pH 5.0 | 8.6 | 7.8 | 8.7 | 7.7 | 8.9 | 7.9 |
| pH 6.0 | 8.1 | 8.6 | 8.2 | 8.0 | 7.6 | 7.4 |
| Tuson | | | | | | |
| pH 2.0 | no gel | | | | | |
| pH 3.0 | 6.6 | 6.6 | 8.2 | 7.4 | 9.0 | 8.0 |
| pH 3.7 (normal) | 5.4 | 5.6 | 6.6 | 7.0 | 5.8 | 6.4 |
| pH 5.0 | 4.0 | 6.6 | 6.4 | 5.8 | 8.0 | 8.6 |
| pH 6.0 | 4.0 | 6.4 | 5.6 | 7.4 | 7.2 | 6.6 |

[a]Syneresis measured as grams of H$_2$O per 20-g gel. Data are the means of three replicates.
[b]One cycle = 24 hours at −17° C., 2 hours at 30° C. and return to −17° C..

EXAMPLE III

The resistance to penetration of the gels by a probe was measured as an indicator of firmness of gel formation and resistance to retraction of the probe from the gels was termed stickiness. Gels at 8% concentration and of several pHs were measured on a Voland-Stevens Texture Analyzer model TA-100 fitted with a cylindrical punch probe (TA-53, 3 mm diameter). Each gel was prepared and divided into two halves for storage at 25° C. or at 4° C. for 24 hours. The data is summarized in Table C. The Amaizo 5 starch gels had very little firmness at any pH. The su2-starch produced firmer gels with greater stickiness than did PFP starch at all pHs and at both storage temperatures.

TABLE C

Gel Strength of 8% Starch Gels.[a]

| Treatment | Firmness 25° C. (g-force) | Stickiness 25° C. (g-force) | Firmness 4° C. (g-force) | Stickiness 4° C. (g-force) |
|---|---|---|---|---|
| PFP | | | | |
| pH 3.0 | 12.4 | 5.2 | 17.6 | 5.8 |
| pH 4.0 | 14.8 | 6.0 | 18.3 | 5.6 |
| pH 4.9 (normal) | 11.6 | 4.2 | 11.3 | 4.0 |
| pH 5.0 | 16.4 | 5.8 | 19.4 | 4.6 |
| pH 6.0 | 17.2 | 6.2 | 13.8 | 4.4 |
| pH 7.0 | 18.4 | 5.8 | 23.2 | 5.6 |
| su2 | | | | |
| pH 3.0 | 17.6 | 6.0 | 18.2 | 7.0 |
| pH 4.0 | 15.2 | 5.4 | 16.2 | 5.4 |
| pH 4.6 (normal) | 16.4 | 7.0 | 18.4 | 9.4 |
| pH 5.0 | 15.2 | 6.2 | 18.2 | 6.6 |
| pH 6.0 | 17.0 | 6.2 | 18.2 | 7.6 |
| pH 7.0 | 17.8 | 6.8 | 18.2 | 7.0 |

TABLE C-continued

Gel Strength of 8% Starch Gels.[a]

| Treatment | Firmness 25° C. (g-force) | Stickiness 25° C. (g-force) | Firmness 4° C. (g-force) | Stickiness 4° C. (g-force) |
| --- | --- | --- | --- | --- |
| Amaizo 5 | | | | |
| pH 3.0 | 8.4 | 4.2 | 14.4 | 5.0 |
| pH 4.0 | 6.2 | 2.6 | 10.8 | 4.2 |
| pH 5.0 | 7.2 | 3.0 | 9.8 | 4.0 |
| pH 5.2 (normal) | 6.0 | 3.0 | 6.0 | 4.0 |
| pH 6.0 | 9.6 | 4.6 | 12.2 | 6.0 |
| pH 7.0 | 8.0 | 5.0 | 19.6 | 9.4 |

[a]Voland Stevens texture analyzer, Voland Corporation, Hawthorne, NY. Data are the means of two replicates.

EXAMPLE IV

A vinegar-containing salad dressing was prepared according to the following formula:

| Ingredients | Wt. (gm) | Wt. (%) |
| --- | --- | --- |
| vegetable oil | 220 g | 35.3% |
| water | 196 | 31.4 |
| egg | 106 | 17.0 |
| sugar | 50 | 8.0 |
| cornstarch | 22 | 3.5 |
| vinegar | 22 | 3.5 |
| salt | 6 | 0.01 |
| dry mustard | 1.8 | 0.003 |

The pH of the dressing was about 5.2 to 5.4 as prepared, and the pH gradually decreased in storage to around 5.0 to 5.1. Because su2-starch tended to give a less viscous product than the other starches it was substituted at 100% and at 150% of the specified starch level. The su2-starch at 150% was thicker than all other treatments in both sensory scores and objective measurements (Brookfield Viscometer). The sensory panel found the su2 product at 100% to increase somewhat in viscosity after one week of storage at 4° C. The Brookfield Viscometer and Texture Analyzer (peak) data also showed a trend for increased viscosity over time for this treatment as well as for the su2 product at 150%. No other starch type showed this trend in either subjective and objective test measures.

Another advantage to the su2-starch (at 100% substitution) was its ability to impart an "airy" texture to the salad dressing which was retained during storage. Both the sensory panel and the specific gravity measurements concurred with that result.

EXAMPLE V

The su2-starch was substituted for a commercial blend of modified starch, vegetable protein and corn syrup solids in a frozen yogurt at a pH of 4.5–5.0. The formula for this product is shown below. The su2-starch yielded a product that was similarly firm with respect to the control as prepared. The su2-starch containing yogurt, however, remained firmer longer when held at room temperatures. This result was especially apparent after the frozen yogurt had been stored frozen for 28 days. The products made with su2-starch remained stable (as measured by drip loss) longer than the control products, both at day 1 and day 28 of storage.

| Formula for Lowfat Hard Frozen Yogurt | | |
| --- | --- | --- |
| Base formula (see below) | 225 g | 75% |
| Plain yogurt, Dannon nonfat | 25 | 8 |
| Raspberry Puree | 50 | 17 |
| Citric acid | 0.8 | 0.35 |
| Base Formula | | |
| Butterfat[a] | 3.0% | |
| Milk Solids Nonfat | 12.0 | |
| Sucrose | | |
| (granular table sugar) | 13.0 | |
| Maltrin corn syrup solids[b] | 6.0 | |
| ULTRA-FREEZE 400[c] | 1.0 | |
| Stabilizer[d] | 0.7 | |
| Total Solids | 35.7% | |

[a]Mid-American Farms, Springfield, MO.
[b]Grain Processing Corporation, Muscatine, IA.
[c]Vegetable protein, corn syrup solids and modified starch blend. A.E. Staley Mfg., Co., Gunther Products, Decatur, IL.
[d]Blend of sodium carboxymethylcellulose, xanthan gum and guar gum (1:1:1).

EXAMPLE VI

Lemon pie fillings were prepared with the following cornstarches: su2-starch, PFP Dent, Salioca 448, Purity 420A, Polar Gel 10, Pure Flo and su2. The su2 cornstarch was evaluated at two starch levels, 100% (8.9 g) and 125% (11.1 g). Xanthan gum (as a percentage of total liquid) was added to the su2 treatments in 3 concentrations: 0.1% (0.13 g), 0.25% (0.33 g) and 0.5% (0.66 g). The following basic formula, adapted and modified from the Basic Food Preparation Laboratory Manual, Iowa State University, was utilized:

| Ingredients | Wt. (gms) |
| --- | --- |
| Water | 118.5 |
| Sugar | 62.5 |
| Egg Yolk | 17.3 |
| Margarine | 14.0 |
| Lemon Juice | 12.5 |
| Cornstarch | 8.9 |
| Xanthan gum | variable |

The dry ingredients for each treatment were weighed, combined and heated with the water and egg yolk individually to 96° C. over medium-high heat while stirring constantly. Preparations were boiled for 60 seconds and removed from heat. The margarine was immediately added and stirred into the mixture. Lemon juice was also added and stirred in with minimal mixing. The product was divided into six 25-g aliquots in 2.5-oz. plastic souffle cups with lids and allowed to cool to 4° C.

All treatments had a pH of substantially 3.6. The su2 starch was evaluated at two starch levels, 100% and 125%. Also, xanthan gum was added to su2 treatments in three concentrations: 0.1%, 0.25% and 0.5%. Leakage of water (syneresis) from the pie fillings was measured during storage for up to 40 days at 4° C. and 56 days frozen. Modified starches, Polar Gel 10 and Pure Flo, had no syneresis for up to 40 days of storage at 4° C. The modified starch, Purity 420A, exhibited only a small amount of syneresis at 18 days of storage. The su2-starch at 100% and at 125% had a small amount of syneresis, which was reduced to almost zero with the addition of xanthan gum. In comparison, regular corn starch (PFP dent) and the modified starch, Salioca 448, had a high amount of syneresis under both conditions. It appears that su2- starch can provide an unexpected resistance to viscosity loss under highly acid conditions, such as in lemon pie fillings. Moreover, su2-starch is believed to be more useful than crosslinked starch because it does not lose viscosity, and can be used without chemical stabilization.

EXAMPLE VII

Starches (Pure Flow, PFP and su2) were compared in a retorted baby fruit pudding, Hawaiian delight flavor. The formula for the baby food is given in Table 13 and objective test results are summarized in Tables 14 and 15. The pH of all treatments was 4.3, which mimicked that found in a similar commercially available product.

The puddings made with su2 and PFP starches were less viscous on day 1 than that made from Pure Flo starch, as measured by a Brookfield viscometer (Table 14). By three months of storage, however, the pudding made with su2 starch was significantly more viscous than puddings made with the other starches, indicating a remarkable stability of the su2 starch to break down during storage. The texture of the puddings as measured by a stexture analyzer showed similar results, with a tendency of puddings made with su2 and PFP to increase in firmness and cohesiveness during storage (Table 15). The su2 starch had significantly more effect thand did the PFP starch.

Table 13

Formula for Hawaiian Delight Baby Food

Hawaiian Delight flavored baby food was prepared with the following cornstarches: PFP Dent, Pure Flo and su2. The following basic formula, derived by evaluation and experimentation of the standard retail product (Gerber Products Co., Fremont, Mich.) was utilized:

| Ingredient | % |
|---|---|
| Water | 35 |
| Skin Milk | 34 |
| Pineapple Juice | 15 |
| Sugar | 9 |
| Rice Flour | 3 |
| Starch | 3.5 |
| Citric Acid | 0.25 |
| Lemon Juice | 0.25 |
| Patco 305[a] | 50 ppm |

[a]Antifoaming agent, American Ingredients Company, Kansas City, MO.

The ingredients for each treatment were weighted, combined and heated over medium-high heat while stirring constantly. Preparations were boiled for 60 seconds and removed from heat. The product was divided into seven 180-g aliquots in half-pint jars. Each replication was processed at 10#pressure for 25 minutes in a home canner (Mirro Corp.).

TABLE 14

Textural Measurements During Storge of Baby Food Made with Three Different Constarches As Measured by a Brookfield Viscometer[a]

| Treatment | Storage Time | | | | |
|---|---|---|---|---|---|
| | 1 day | 2 weeks | 1 month | 2 months | 3 months |
| | | | centipoise | | |
| Pure Flo[b] | 5,500 ef | 6,200 efg | 6,100 efg | 6,300 efg | 6,100 efg |
| PFP[c] | 2,300 d | 4,600 de | 6,300 efg | 7,500 efg | 8,100 fg |
| su2 | 2,200 d | 4,500 de | 6,800 efg | 9,100 g | 13,200 h |

[a]Model RVT, Brookfield Engineering Laboratories, Stoughton, MA. Values are the means of three replications.
[b]National Starch and Chemical Corp., Bridgewater, NJ.
[c]Pure food-grade powdered cornstarch, American Maize Products Co., Hammond, IN.
[d-h]Values not followed by a common letter are significantly different (p ≦ 0.05).

TABLE 15

Textural Measurements During Storge of Baby Food Made with Three Different Constarches As Measured by a Texture Analyzer[a]

| Treatment | Storage Time | | | | |
|---|---|---|---|---|---|
| | 1 day | 2 weeks | 1 month | 2 months | 3 months |
| FIRMNESS - gm-force to compress 10 mm distance with 37 mm-diam. disk. | | | | | |
| Pure Flo[b] | 39.0 def | 43.3 def | 43.7 def | 46.0 f | 51.7 fg |
| PFP[c] | 26.3 d | 49.0 fg | 45.3 ef | 51.7 fg | 66.7 g |
| su2 | 27.0 de | 45.8 ef | 48.5 fg | 57.3 fg | 86.5 h |
| COHESIVENESS - negative load (gm-force) on 37 mm-diam. disk during reaction. | | | | | |
| Pure Flo[b] | 34.3 ef | 25.7 ef | 26.7 ef | 26.3 ef | 28.0 ef |
| PFP[c] | 15.0 d | 20.7 de | 21.3 de | 25.7 ef | 23.7 ef |
| su2 | 16.8 d | 24.0 ef | 26.0 ef | 30.5 f | 40.5 g |

[a]TA.XT2, Texture Technologies Corp., Scarsdale, NY. Values are the means of three replications.
[b]National Starch and Chemical Corp., Bridgewater, NJ.
[c]Pure food-grade powdered cornstarch, American Maize Products Co., Hammond, IN.
[d-h]Values within each table not followed by a common letter are significantly different (p ≦ 0.05).

We claim:

1. In a foodstuff mixture containing starch as a thickener and which has an acidic pH below 5.5, the improvement comprising using as said starch in said mixture an effective thickening amount of a sugary-2 starch obtained from sugary-2 genotype maize seeds.

2. The foodstuff mixture of claim 1 which has an acidic pH below 5.0.

3. The foodstuff mixture of claim 2 which is further characterized by being a lemon pudding mixture or a lemon pie filling mixture.

4. The foodstuff mixture of claims 1 or 2 in which said sugary-2 starch is gelatinized and said mixture in gel form.

5. The foodstuff mixture of claims 1 or 4 which has a pH of 2.5 to 4.5 said pH being provided by citric acid, acetic acid, or mixtures thereof, and said mixture with the required amount of water incorporated therein containing from 1 to 4 weight percent of said sugary-2 starch.

6. The foodstuff mixture of claim 1 which is further characterized by being a baby food.

7. The foodstuff mixture of claim 1 which is further characterized by being a tomato sauce or tomato paste.

8. The foodstuff mixture of claim 1 which is further characterized by being a vinegar-containing salad dressing.

9. A method for preparing a thickened acidic foodstuff, comprising combining a sugary-2 starch with water and a mixture of foodstuff ingredients of the kind in which starch is used as a thickener and which mixture has an acidic pH of 2.0 to 5.5 when combined with the water, said sugary-2 starch being obtained from sugary-2 gentotype maize seeds and being used in an effective amount when gelatinized for thickening the mixture.

10. The method of claim 9 in which said sugary-2 starch after combining with said ingredients is gelatinized by heating.

11. The method of claims 9 or 10 in which said foodstuff is in the form of a gel and said gel has a pH of 2.5 to 5.0.

12. The method of claims 9 or 10 in which said foodstuff has a pH of 2.5 to 4.5.

13. The method of claim 9 in which said foodstuff is a lemon pudding or a lemon pie filling.

14. The method of claim 9 in which said foodstuff is a baby food.

15. The method of claim 9 in which said foodstuff is a tomato sauce or a tomato paste.

16. The method of claim 9 in which said foodstuff is a vinegar-containing salad dressing.

* * * * *